United States Patent [19]
Moser

[11] Patent Number: 5,257,288
[45] Date of Patent: Oct. 26, 1993

[54] DATA TRANSMISSION SYSTEM

[75] Inventor: Helmut Moser, Heilbronn, Fed. Rep. of Germany

[73] Assignee: Telefunken electronic GmbH, Heilbronn, Fed. Rep. of Germany

[21] Appl. No.: 682,233

[22] Filed: Apr. 9, 1991

[30] Foreign Application Priority Data

May 10, 1990 [DE] Fed. Rep. of Germany ....... 4014931

[51] Int. Cl.$^5$ .............................................. H04B 14/04
[52] U.S. Cl. ......................................... 375/25; 375/23; 370/8; 341/53
[58] Field of Search ....................... 375/21, 22, 23, 25, 375/113; 370/8, 9, 10; 341/53; 381/52

[56] References Cited

U.S. PATENT DOCUMENTS 3,528,011  9/1970  Anderson ............................... 375/22
4,866,737  9/1989  Seifried .................................. 375/22

FOREIGN PATENT DOCUMENTS 3717886  12/1988  Fed. Rep. of Germany .

OTHER PUBLICATIONS

Jahn, W. S.: "Elektrisch Messen, . . . "; R. Pflaum Verlag München, 1964; s. 51–53.

Primary Examiner—Curtis Kuntz
Assistant Examiner—T. Ghebretinsae
Attorney, Agent, or Firm—Spencer, Frank & Schneider

[57] ABSTRACT

A data transmission system and method in which digitalized information is transmitted via a data transmission link in complete binary words from a transmitter to a receiver. For data transmission, a complete binary word with a defined total bit number is subdivided into one or more partial binary words, with the respective bit numbers of the partial binary words being variable. The individual partial binary words are allocated all binary bit sequences that can be formed with the total number bits of the respective partial binary words, the various bit sequences being coded at respectively different positions within a partial binary word In each partial binary word exactly one binary bit sequence is transmitted from the transmitter to the receiver.

25 Claims, 3 Drawing Sheets

DATA TRANSMISSION SYSTEM

DESCRIPTION OF THE PRIOR ART

The invention relates to a data transmission system of the type wherein digitalized information is transmitted via a data transmission link in complete binary words from a transmitter to a receiver.

Data transmission systems in digital technology transmit information in the form of digitalized data packets via a data transmission link between a transmitter and a receiver. The data can be transmitted in, for example, the infrared range, the radio frequency range or the ultrasonic range using the appropriate suitable transmitter equipment, receiver equipment and transmission links. The digitalized data packets or binary sequences, the so-called binary words, are transmitted here in the form of rectangular pulses.

In standard data transmission systems, a transmission pulse is required for each digitalized information unit to be output or transmitted to the receiver —i.e., for each bit emitted by the transmitter. To code the two different information units "0" and "1" of the binary code, the pulses are either emitted at different times within a determined time interval, for example, by means of pulse interval modulation, or modulated using different frequencies.

Since a pulse has to be emitted for every bit transmitted by the transmitter, the energy requirement for the data transmission is quite high on the transmitter side. In addition, dependability is not especially high with this data transmission mode; to improve this, expensive measures, for example duplicate transmission of the information with subsequent comparison, are required.

SUMMARY OF THE INVENTION

The object underlying the invention is to provide a new transmission principle for a data transmission system in which the energy requirement on the transmitter side can be reduced and the dependability improved.

The above object generally is achieved in accordance with the invention by a data transmission system or method in which digitalized information is transmitted via a data transmission link in complete binary words from a transmitter to a receiver and wherein: for data transmission, a complete binary word with a defined total number of bits is subdivided into one or more partial binary words, with the number of bits of the partial binary words being variable; each individual partial binary word is allocated all binary bit sequences that can be formed with the total number of bits of the respective partial binary word; the respective various bit sequences are coded at respectively different positions within a partial binary word; and in each partial binary word, exactly one binary bit sequence is transmitted from the transmitter to the receiver.

More particularly and preferably, the binary bit sequences are transmitted such that in each partial binary word from the transmitter, a transmission pulse for a position bit is emitted in the form of a rectangular pulse at that position of the respective partial binary word at which the binary bit sequence to be transmitted (and corresponding to the partial binary word) is coded, and the receiver allocates the transmission pulse to that binary bit sequence corresponding to the position of the transmission pulse.

In accordance with the invention, the complete binary word is divided up into one or more partial binary words with variable bit number, the number of the partial binary words and the number of bits per partial binary word being permanently set for a certain bit number of the complete binary word, preferably by means of a computer.

Each partial binary word is allocated a certain number of positions —dependent on the bit number of the partial binary word each of which code for certain bit sequences; this coding can differ for the various partial binary words.

For data transmission, a transmission pulse is emitted—after emission of a start bit pulse—by the transmitter at a certain position within each partial binary word; this position bit pulse is detected by the receiver and the bit sequence corresponding to the respective position is allocated. The transmitted bit sequences of the individual partial binary words are combined into a complete binary word; this emits, after decoding of the complete binary word, an output signal corresponding to the transmitted information.

Since in accordance with the invention a single transmission pulse emitted by the transmitter—that for the position bit—already codes, for a partial binary word, a bit sequence of several bits and not only for a single bit, far fewer transmission pulses are necessary for transmission of an n-bit complete binary word instead of n-transmission pulses; the energy requirement for the transmitter can therefore be considerably reduced. The division of the complete binary word into partial binary words, i.e. the number of partial binary words and their respective bit number, can be optimized to suit the total bit number of the complete binary word to be transmitted in order to achieve a minimum energy requirement and transmission expenditure. This division or allocation is preferably permanently preset by a computer that also controls the timing in the transmitter and receiver as well as the coordination between the transmitter and the receiver.

The reduction of the pulses necessary for data transmission brings not only a reduction in the energy requirement, but also a substantial improvement in dependability. In addition, the position bit pulses can be given, depending on the respective partial binary word or on the position within a partial binary word, a different characteristic. Since, the receiver must recognize and verify this characteristic, the dependability can thereby be further increased. A better error evaluation can, for example, be achieved when the pulse width of the position bit pulses is varied between even and uneven in consecutive partial binary words or within a partial binary word as a function of the position. The differing pulse width can be set by variation of the pulse duration or, if the pulses are modulated with a certain frequency, by variation of the number of oscillation periods. Alternatively to variation of the pulse width, the oscillation frequency with which the transmission pulses are modulated can also be varied.

Additionally or alternatively to the change in the characteristic of the transmission pulses, it is possible to emit an additive auxiliary bit pulse—which does not itself code for information —before the start pulse bit; data transmission by means of the position bit pulses or evaluation by the receiver is only started when the auxiliary bit pulse has been transmitted from the transmitter to the receiver at a certain time, previously set before the start bit pulse.

Thanks to the low energy requirement for the data transmission system in accordance with the invention, an additional check partial binary word following on from the last partial binary word of the complete binary word can be transmitted as a further check mechanism and to verify the code of the last information transmitted. In this check partial binary word, a position bit pulse is for example always emitted at a predetermined position of the partial binary word, or parity formation or addition on the basis of the previously transmitted bit sequences of the individual partial binary words is performed. This permits easy recognition of transmission errors, and the usual duplicate transmission of information for error recognition can be dispensed with.

BRIEF DESCRIPTION OF THE DRAWINGS

The invention is described in greater detail below on the basis of FIGS. 1 to 3.

Here.

DESCRIPTION OF A PREFERRED EMBODIMENT

Figure 1:
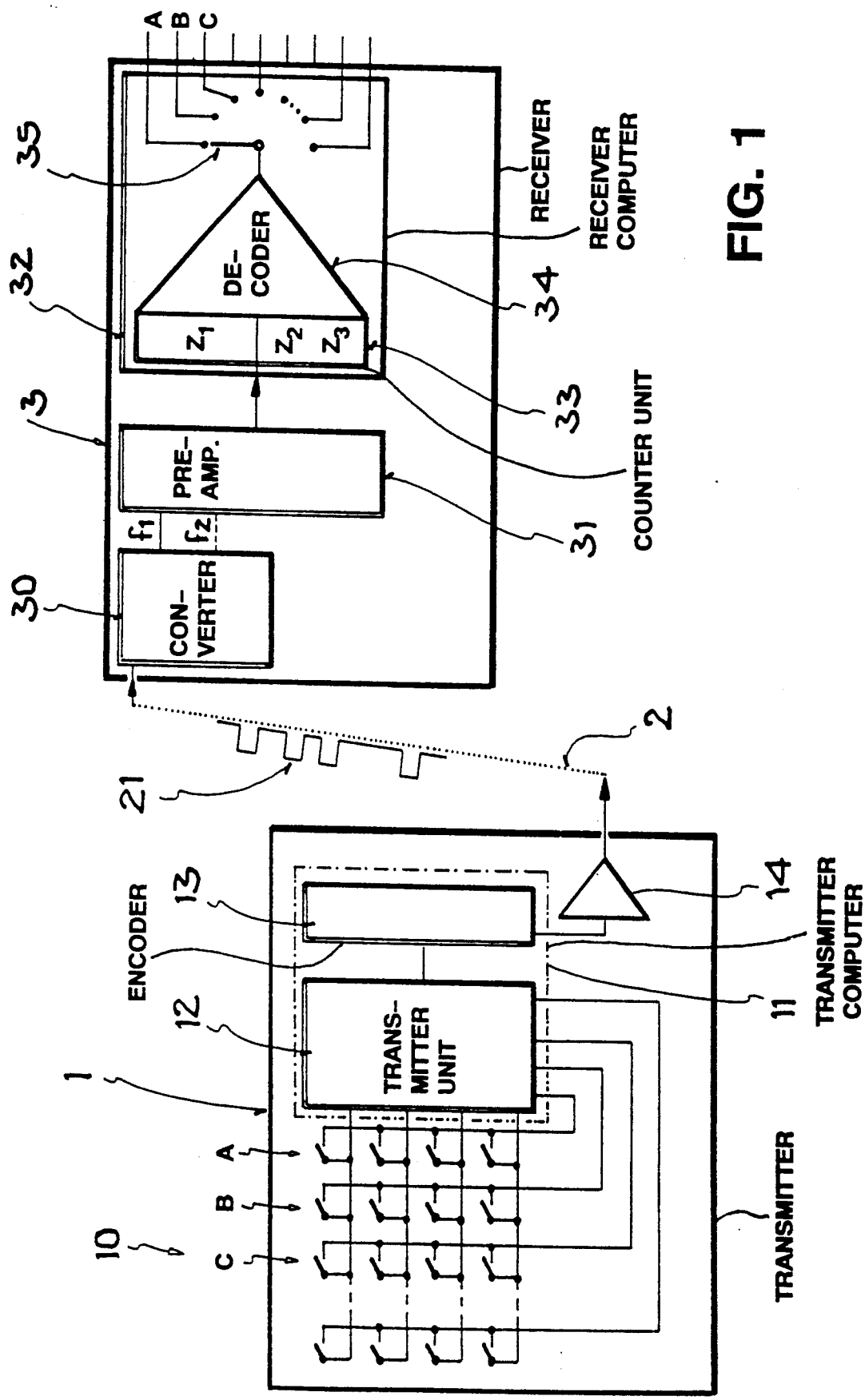
FIG. 1 is the layout in diagram form of a data transmission system.

In accordance with FIG. 1, the data transmission system is made up of the transmitter 1, the transmission link 2 and the receiver 3.

The transmitter 1 predetermines, codes and emits at the transmitter output the information to be transmitted. In FIG. 1, the information is converted into a complete binary word, after key A, B, C etc. of keyboard 10 is pressed, by the transmitter computer 11, which comprises, for example, the transmitter unit 12 proper and the keyboard encoder 13. The keyboard encoder 13 is a control logic unit for processing the transmission signal and for regulating the timimg of the transmitter signal, for example for subdividing the complete binary word into the various partial binary words and for providing the various transmission pulses 21. The driver 14, for example a power amplifier, passes the transmission pulses 21 to the transmission link 2. Data can be transmitted via the data transmission link 2 in, for example, the infrared range, the radio frequency range or the ultrasonic range without carrier or via fixed wires/lines. The characteristic sequence of transmission pulses 21 emitted by the transmitter when the keyboard 10 is operated, for example, by pressing a certain key A, B, C, . . . , is evaluated by the receiver 3, by the receiver detecting the transmitted pulse sequence, decoding it, and then emitting an output signal characteristic for the pressed key of the transmitter 1. For this purpose, the receiver 3 has a converter 30 that converts the transmission pulses 21 into an electrical signal, a pre-amplifier 31 that can have, for example, two selective inputs for distinguishing two different frequencies $f_1$ and $f_2$, a receiver computer 32 comprising a counter unit 33 with the time counters $Z_1$ to $Z_3$, and a decoding unit 34 with the switch 35. The decoded signal is, for example as a HIGH or LOW logic level, emitted to one of the lines A, B, C, . . . allocated to the appropriate pressed key.

In the case of a data transmission system in the IR range, for example, in an IR remote control, IR transmission pulses 21 are emitted by the driver 14, which comprises for example a transistor and an IR transmitter diode, and are modulated with a frequency of 40 kHz, for example. The IR transmitter signal thus modulated is converted in the converter 30, for example an IR receiver diode, into a voltage or current. The preamplifier 31 contains an integrator that smoothes the modulated signal and supplies it to the receiver computer 32. A switching module controlled depending on the key pressed is connected to the receiver output, for example.

Figure 2:
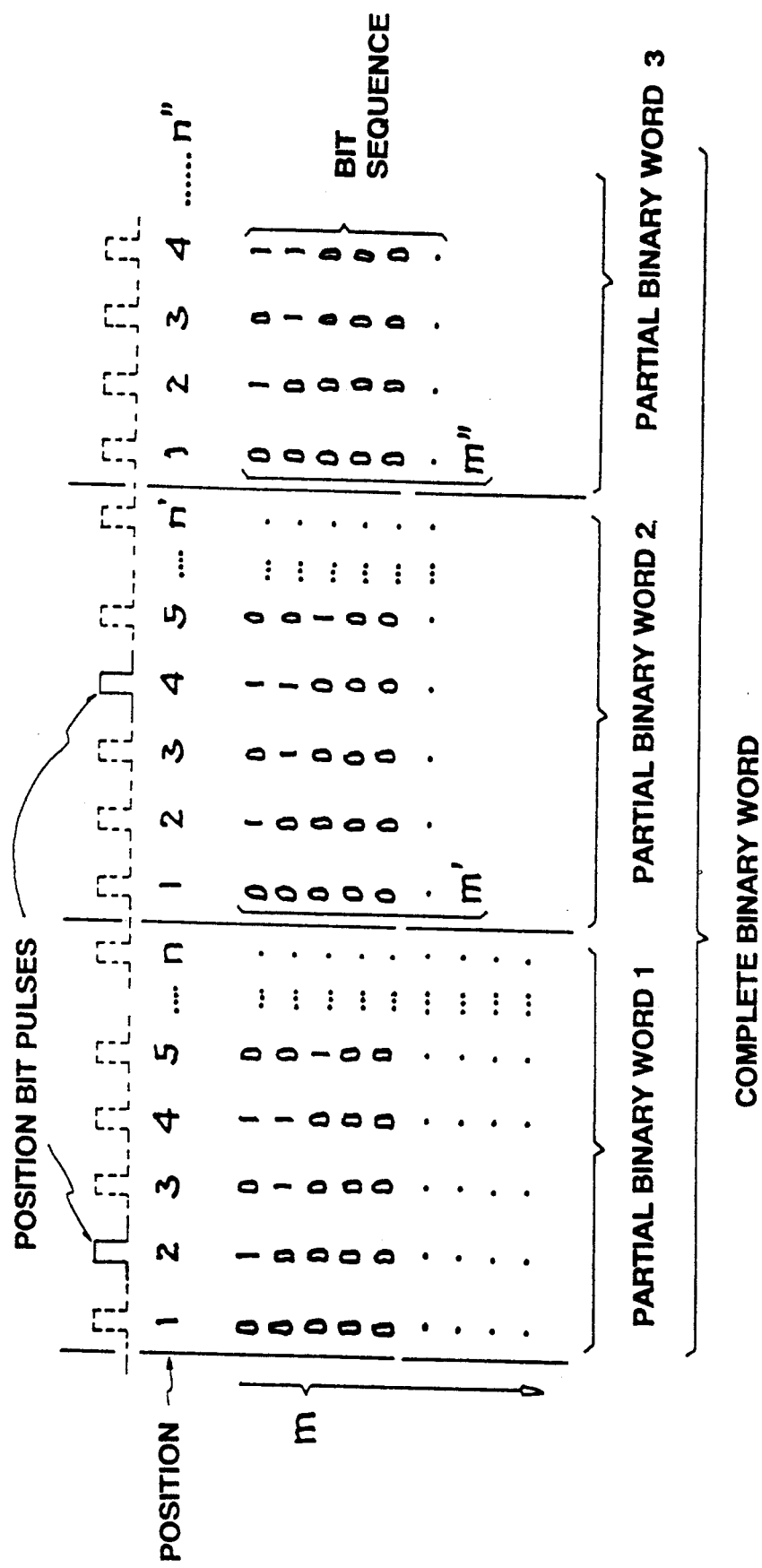
FIG. 2 shows the coding principle of an n-bit binary word.

The coding principle of the transmission pulses used for data transmission is shown in diagram form in FIG. 2. The complete binary word is subdivided into several partial binary words; FIG. 2 shows three partial binary words, with the first partial binary word 1 having m-bits, the second partial binary word 2 m'-bits and the partial binary word 3 m"-bits. The number of positions n (n', n") within the partial binary words is given by the relationship $n=2^m$; i.e. the first partial binary word has $2^m$, the second partial binary word $2^{m'}$, the third partial binary word $2^{m''}$ positions. Different partial binary words can have different bit numbers m, m', m" and therefore a different number of positions n, n', n". Each position within a partial binary word codes for a certain bit sequence with m (m', m") bits, so that in each partial binary word all bit combinations that can be formed with the bits of the partial binary word are allocated to the different positions. The division of the complete binary word into the partial binary words, the number of bits per partial binary word and the allocation of the respective positions to the corresponding bit sequences are determined before data transmission and filed in a memory. This determination process can, for a certain bit number of the complete binary word, be achieved either by hardware with hard wiring, or by software, for example using a microprocessor. This subdivision or allocation can be selected for high flexibility, with different bit sequences being allocated to the same position in different partial binary words.

Within each partial binary word, the bit sequence coded at the respective position is allocated by the position bit pulse output by the transmitter at a position 1 . . . n (n', n") to this partial binary word in the receiver. In accordance with FIG. 2, for example, the position bit pulse is output at position 2 in the partial binary word 1 and the binary bit sequence 10000 . . . effectively is transmitted, in partial binary word 2 the position bit pulse is output at position 4 and the binary bit sequence 11000 . . . effectively is transmitted etc.

Figure 3:
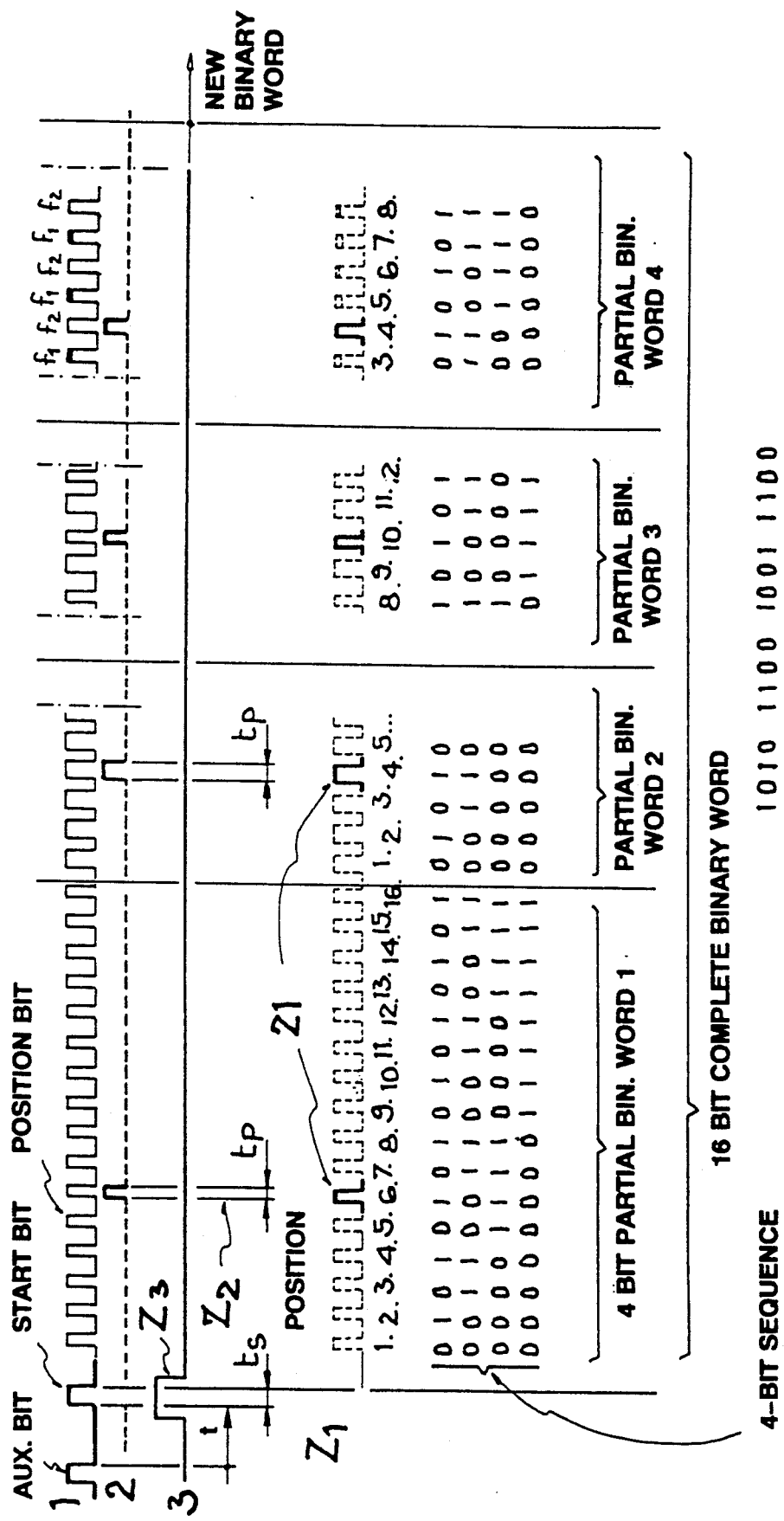
FIG. 3 shows the time sequence for data transmission in the case of a 16-bit binary word.

The principle and the timing of the data transmission is illustrated in FIG. 3 using the example of a 16-bit complete binary word.

The 16-bit complete binary word to be transmitted, for example the bit sequence 1010110010011100 in accordance with FIG. 3, is split up into 4 equal partial binary words of 4 bits each prior to transmission, so that each partial binary word has $2^4=16$ positions 1 to 16. Depending on which position 1 to 16 the position bit pulse is output at by the transmitter, this pulse is allocated a 4-bit sequence 0000 to 1111 in the receiver as a function of the position. FIG. 3 the same position/bit sequence allocation was selected for all 4 partial binary words 1 to 4. For the 16-bit complete binary word to be transmitted, it is necessary, for example in accordance with the subdivision into 4 equal partial binary words as selected above, that the position corresponding bit pulses be at position 6 (bit sequence 1010) in partial binary word 1, at position 4 (corresponding bit sequence 1100) in partial binary word 2, at position 10 (corresponding sequence 1001) in partial binary word and at position 4 (corresponding bit sequence 1100) in partial binary word 4. In the receiver, reception of the transmitted start bit pulse is followed by starting of the time counter $Z_1$, which, knowing the length of the respective partial binary words, i.e. the number of positions, monitors the timing within the partial binary words. The counter $Z_1$ therefore marks and determines the position within the partial binary words, at which-position the position bit pulse was emitted by the transmitter. When the first position bit pulse has been recognized, it is allocated the first 4-bit partial binary word 1010 by the receiver, after recognition of the second position bit pulse the second 4-bit partial binary word 1100 etc. After the last 4-bit partial binary word 4 (1100) has been recognized by the receiver, the bit sequences of the various partial binary words are combined into the complete binary word, and after decoding of the complete binary word, an output signal is emitted. The time cycle can now begin at the start, i.e. the receiver is ready to receive a new complete binary word. The further complete binary word can represent a repetition of the transmitted information, for example by lengthy pressing of one key of the transmitter, or new information, for example by pressing a different key of the transmitter. The time counter $Z_1$ is re-initialized at the start of transmission of the new complete binary word, for example by the microprocessor.

To detect errors and as a means of checking the data transmission, a further time counter $Z_2$ is provided that monitors the pulse width $t_s$ of the start bit pulse and of the position bit pulses $t_p$. For example, even/uneven positions—as shown for the partial binary word 3 in accordance with FIG. 3, or consecutive partial binary words—as shown in FIG. 3 for the partial binary words 1 and 2—can be allocated different pulse widths of the transmission pulses. This can be achieved by, for example, a variation in the pulse duration or, in the case of modulated transmission pulses, by a different number of oscillation periods of the modulation frequency. With a faulty pulse width, there is no evaluation of the transmission signal on the receiver side.

Instead of varying the pulse width $t_p$, the various emitted position bit pulses can be allocated different modulation frequencies. This is shown as an example in FIG. 3 for the two frequencies $f_1$ and $f_2$ in the partial binary word 4, where the frequency is varied even-/uneven depending on the position.

Error recognition is also given, i.e. the evaluation of the transmission signal is likewise not started on the receiver side, —when the time t between the auxiliary bit pulse and the start bit pulse is not inside a previously determined time interval or window. The time t is monitored by a further time counter $Z_3$. Thanks to these error recognition methods or check mechanisms, it is possible to ensure a very dependable data transmission in addition to reducing the energy requirement. This permits duplicate binary word transmissions with subsequent binary word comparisons as normally applied, for example, in infrared transmissions—to be dispensed with.

The data transmission system in accordance with the invention can be used, for example for infrared remote control of television or in automobiles for opening and closing of doors etc.

Transmission systems in the radio frequency range or in other wavelength ranges of the electro-magnetic spectrum are also conceivable.

What is claimed is:

1. In a data transmission system in which digitalized information is transmitted via a data transmission link in complete binary words from a transmitter to a receiver; the improvement wherein said transmitter includes means for subdividing a complete binary word with a defined total bit number into one or more partial binary words, with the bit number of the respective said partial binary words being variable; means for storing, for each individual partial binary word, all binary bit sequences that can be formed with the total number of bits of the respective partial binary word, and with the various bit sequences being coded at respectively different positions within a respective partial binary word; and means for transmitting to said receiver, in each partial binary word, a signal corresponding to the coded position of exactly one binary bit sequence indicative of the information to be transmitted.

2. A data transmission system in accordance with claim 1, wherein said means for transmitting includes means for emitting, in each partial binary word, a transmission pulse for a position bit in the form of a rectangular pulse at that position of the respective partial binary word at which the binary bit sequence to be transmitted is coded; and wherein the receiver includes means for allocating said transmission pulse to that binary bit sequence corresponding to the position of said transmission pulse within the respective partial binary word.

3. A data transmission system in accordance with claim 2, wherein the receiver further includes means for combining the binary bit sequences corresponding to the transmission pulses in the individual partial binary words into a complete binary word, and a decoder for emitting an output signal corresponding to the transmitted information.

4. A data transmission system in accordance with claim 1, wherein said means for subdividing the complete binary words with a certain total bit number into the individual partial binary words and the respective bit number of said partial binary words prior to data transmission comprises a computer that also controls the time coordination between the transmitter and the receiver.

5. In a data transmission method including transmitting digitalized information via a data transmission link in complete binary words from a transmitter to a receiver; the improvement wherein said step of transmitting includes: subdividing a complete binary word with a defined total bit number into one or more partial binary words, with the bit number of said partial binary words being variable; allocating to the individual partial binary words, all binary bit sequences that can be formed with the total number of bits of each respective partial binary word; coding the various said bit sequences at respectively different positions within a respective partial binary word; and in each partial binary word, transmitting exactly one binary bit, corresponding in position to the coded bit sequence, from the transmitter to the receiver.

6. A data transmission method in accordance with claim 5, wherein said step of transmitting one binary bit includes emitting in each partial binary word, a transmission pulse for a position bit in the form of a rectangular pulse at that position of the respective partial binary word at which the binary bit sequence to be transmitted is coded; and further comprising the steps of receiving the transmission pulse in the receiver and allocating said transmission pulse to that binary bit sequence corresponding to the position of said transmission pulse in the respective partial binary word.

7. A data transmission method in accordance with claim 6, further comprising the step of combining the binary bit sequences corresponding to the transmission pulses in the individual partial binary words received in the receiver into a complete binary word, and emitting an output signal corresponding to the transmitted information.

8. A data transmission method in accordance with claim 5, wherein said step of subdividing the complete binary words with a certain total bit number into the individual partial binary words and the respective bit number of said partial binary words are determined prior to data transmission by a computer that also controls the time coordination between the transmitter and the receiver.

9. A data transmission method in accordance with claim 6, further comprising controlling the timing of the data transmission in the receiver by time counters integrated in a receiver computer.

10. A data transmission method in accordance with claim 9, wherein said step of controlling the timing includes using a first time counter ($Z_1$) to mark the position of the position bit pulses in the individual partial binary words.

11. A data transmission method in accordance with claim 9, wherein said step of controlling includes using a second time counter ($Z_2$) to monitor the pulse width ($t_p$) of the position bit pulses.

12. A data transmission method in accordance with claim 6, further comprising emitting a start bit pulse in the form of a rectangular pulse before the first position bit pulse of the first partial binary word.

13. A data transmission method in accordance with claim 6, wherein said step of transmitting further includes emitting, after the position bit pulse of the last partial binary word, an additional position bit pulse for a check partial binary word used to very the code of the information previously transmitted.

14. A data transmission method in accordance with claim 13, wherein the position bit pulse in said check partial binary word is always emitted at the same position in said check partial binary word and is therefore always allocated the same binary bit sequence in the receiver.

15. A data transmission method in accordance with claim 13, further comprising determining the position of the position bit pulse in the check partial binary word by parity formation or addition of the previously transmitted binary bit sequences of the complete binary word.

16. A data transmission method in accordance with claim 12, wherein said step of transmitting further comprises emitting an auxiliary bit pulse before the start bit pulse; and starting data transmission only when the time (t) between the auxiliary bit pulses and the start bit pulse is inside a time interval predetermined by a time counter ($Z_3$).

17. A data transmission method in accordance with claim 16, further comprising determining a pulse width ($t_s$) of the start bit pulse by a second time counter ($Z_2$) and starting data transmission only when said pulse width ($t_s$) is inside a certain predetermined time interval.

18. A data transmission method in accordance with claim 6, wherein the position bit pulses have different characteristics depending on the respective partial binary word and/or on the position within said partial binary word.

19. A data transmission method in accordance with claim 18, wherein the position bit pulses have alternating characteristics in consecutive partial binary words.

20. A data transmission method in accordance with claim 18, wherein the position bit pulses have alternating characteristics in consecutive positions within the partial binary words.

21. A data transmission method in accordance with claim 18, wherein the pulse width of the position bit pulses is varied.

22. A data transmission method in accordance with claim 18, wherein the pulse duration of the position bit pulses is selected differently in order to vary the pulse width.

23. A data transmission method in accordance with claim 21, wherein the number of oscillation periods of a modulation frequency is selected differently in order to vary the pulse width of the position bit pulses.

24. A data transmission method in accordance with claim 18, wherein the frequency of the position bit pulses is varied.

25. A data transmission method in accordance with claim 24, wherein two different frequencies ($f_1$, $f_2$) are selected.

* * * * *